March 17, 1925.
J. J. M. GUEUX
WATER METER WITH REVOLUBLE PISTON
Filed Feb. 2, 1922
1,530,044
2 Sheets-Sheet 1
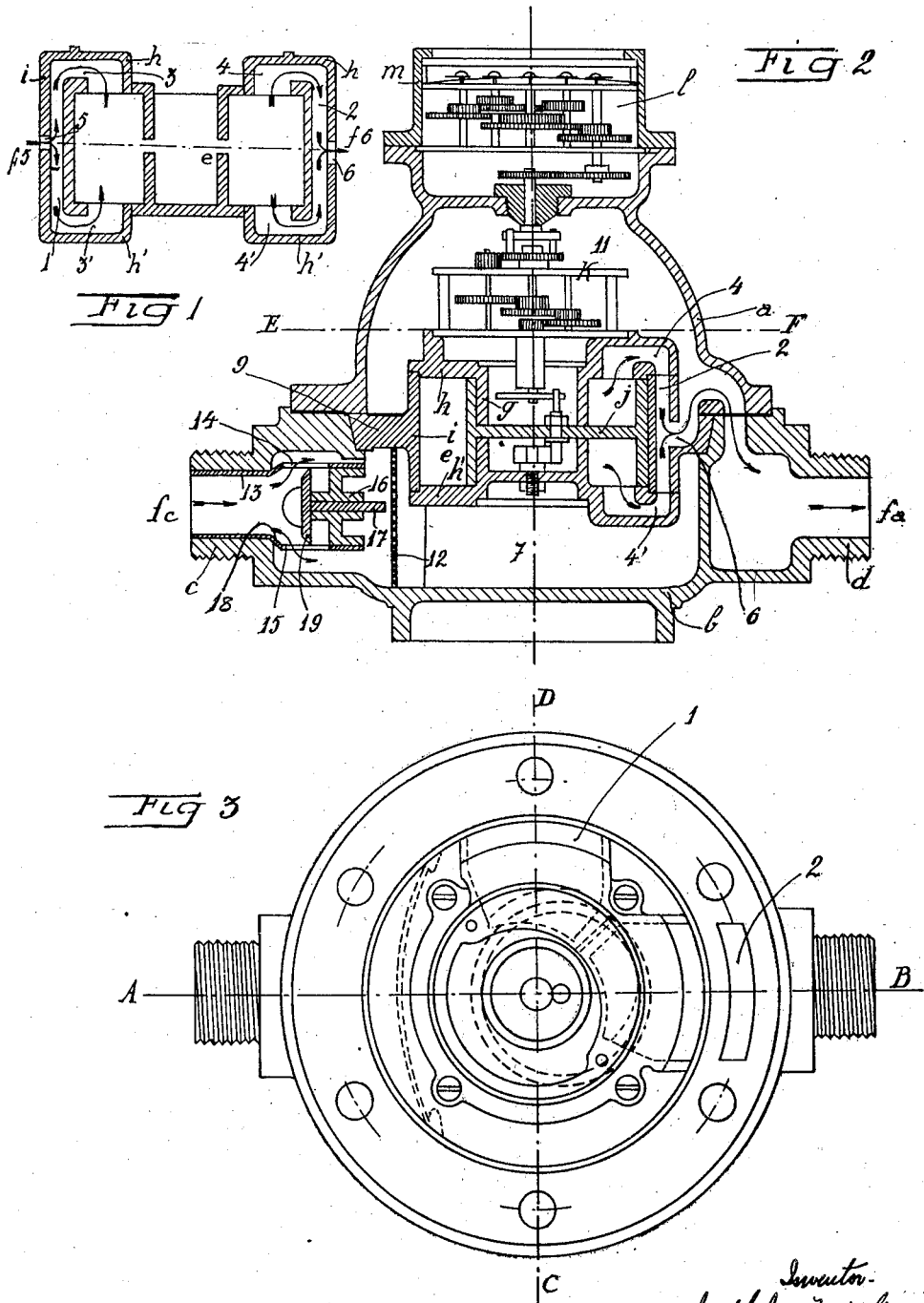

Patented Mar. 17, 1925.

1,530,044

UNITED STATES PATENT OFFICE.

JOSEPH JEAN MARIE GUEUX, OF PARIS, FRANCE.

WATER METER WITH REVOLUBLE PISTON.

Application filed February 2, 1922. Serial No. 533,605.

*To all whom it may concern:*

Be it known that I, JOSEPH JEAN MARIE GUEUX, residing in Paris, France, have invented new and useful Improvements in Water Meters with Revoluble Pistons (for which I have filed applications for patents in France #139,478, January 31, 1921, and in Germany #G-53,458, March 29, 1921), of which the following is a specification.

My invention relates to water meters with revoluble piston. It is known in meters of this kind to provide a chamber in which a piston is displaced to free or obstruct alternately openings for the inlet and the outlet of the water, assuring thereby a constant charge which is suitable for computation in each operation. One of the characteristics of the present invention resides in the fact that the passages which permit the water to suitably flow into the said chamber are fed by a single opening and that those passages which take care of the evacuation identical with those for the admission, also terminate in a single similar opening and placed in the same horizontal plane. Another characteristic of the invention consists in the fact of disposing the said orifices in the horizontal plane of symmetry of the piston, and in giving suitable dimensions to both orifices depending upon the amount of water flow. Another characteristic consists in the use of a like section for each orifice, whereof one serves to supply the admission passages and the other receives the water from the discharge passages, and also in the various mechanical arrangements of certain essential elements of the meter.

All these characteristics have for their object to obtain effects of an absolutely symmetrical nature upon the piston and the diaphragm of the same from the water flowing through the meter, and the apparatus furthermore provides for the fact that the discharge of the liquid from the water chamber shall take place at the same speed as the admission, and in this manner the volume of water in movement in the piston chamber, as well as the piston, are not affected by sudden changes of pressure in the main piping, that is, by water-hammering. On the other hand, the special arrangements adopted for certain essential elements are intended to simplify the construction of the apparatus and to facilitate the dismounting of the same.

The following description, together with the accompanying drawings which are given by way of example, sets forth embodiments of this invention, wherein:

Figure 1 is a diagrammatic sectional view of the piston chamber of my improved meter.

Figure 2 is a vertical central sectional view of a meter constructed and arranged in accordance with my invention.

Fig. 3 is a plan view on the line E—F Fig. 2, the meter being open and the set of gearing removed.

The meter shown in Fig. 2 essentially comprises the following elements;

An outer casing of suitable shape consisting of an upper part $a$ and a lower part $b$; necks for the admission and discharge of water $c$, $d$, the water entering according to the arrow $f$ $c$ and leaving according to the arrow $f$ $a$; a receptacle $e$ comprising a central cylinder $g$ connected with portions $h$, $h^1$ constituting upper and lower discs, and an external crown-piece $i$ of suitable shape bearing upon the casing of the meter; a revoluble piston $j$ having the characteristics of the known pistons; a set of gearing K actuated by the revoluble piston $j$ and driving in turn a counter of revolutions $l$ disposed in a cap $m$ which is secured to the top of the upper part of the casing $a$.

The particular features of the meter according to my invention are set forth hereunder.

The crown-piece $i$ comprises, Fig. 1, two passages 1 and 2 communicating at the upper and lower parts with the parts 3 and $3^1$, 4 and $4^1$ suitably formed in the discs $h$, $h^1$ whereby the same are connected with the casing $e$ having movable therein the piston

Figure 4:
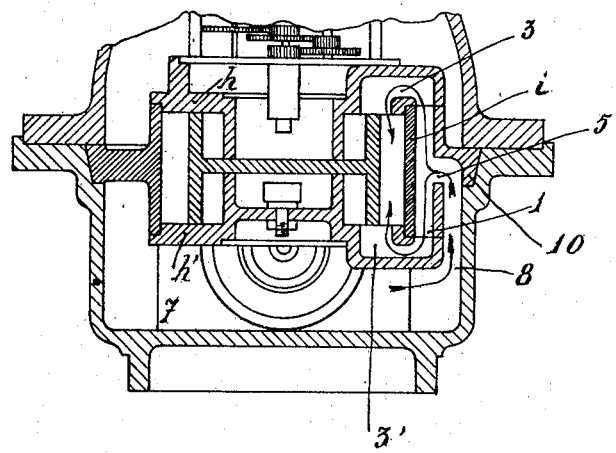
Fig. 4 is a section on the line C—D Fig. 3 showing the orifice and the passages for admission into the piston chamber.

*j.* The passage 1 constitutes a water admission chamber and the passage 2 a discharge chamber, both having substantially rectangular sections, Fig. 3, in the preferred construction. At the middle part in the height of the same, that is, on the horizontal axis of the diaphragm of the piston *j*, are disposed two orifices also of rectangular shape 5 (Fig. 4) and 6 (Fig. 2). In Fig. 1 the flow of the water is diagrammatically indicated, the water entering according to the arrow $f^5$ and leaving according to $f^6$. In the above-mentioned arrangement, it will result that the orifices 5 and 6, of uniform cross-section, are disposed in the horizontal plane of symmetry of the casing *e*, and that the efforts occasioned by the water pressure are symmetrical during the entire flow of the latter in the piston chamber from the admission orifice 5 to the discharge orifice 6.

It will result from the preceding that the chamber 1 is supplied by the orifice 5 whilst the orifice 6 serves for the discharge of the water which has entered the chamber 2, the said orifices 5 and 6 having a like cross-section and being situated on the horizontal axis of the piston chamber. The vertical passages 1 and 2, the ports 3 and $3^1$, 4 and $4^1$ have a greater cross-section than the orifices of like section 5 and 6, whereby the latter orifices alone shall limit the speed of the water in the piston chamber, thus obviating all throttling action susceptible of producing an abnormal loss of pressure as well as disturbances in the water flow arrangement.

The great technical advantages afforded by the said arrangement are set forth in the preamble. Furthermore, aside from the above-mentioned features which relate particularly to the piston chamber of the meter, the following dispositions remain to be mentioned:

The water flows in (Fig. 2) through the tube C and spreads out in the lower part 7 of the enclosure. It is admitted into the opening 5 through the annular space 8 and from there it passes into the canals 1 and enters through the passages 3 and $3^1$ into the chamber E of the piston, which functions in the same way as already has been realized in similar apparatus assuring the evacuation of the water through the passages 4, canals 2, openings 6, towards the conduit D. The crown-piece *i* is provided with bearing portions 9 (Fig. 2) and 10 (Fig. 4) which separate the lower chamber 7 from the upper chamber 11; the latter is filled by the water which is discharged through the orifice 6 before this water can be discharged from the meter through the passage *d*. A slightly conical shape is given to the edge of the crown-piece *i*, as shown in Figs. 2, 4, 5 and 6. This conical shape facilities the dismounting of the piston chamber and provides for a perfectly fluid-tight separation between the entering and the evacuated water.

At 12 is indicated a filter of large size placed before the chamber 7, forwardly of the said filter is disposed a valve which is constituted as follows: A socket 13 is inserted by tight friction in the admission neck *c* and possesses an enlarged portion extending outwardly of the said neck and within the casing of the meter. In this latter portion are formed the ports, whereof two are indicated at 14 and 15; at the end of the said socket is mounted the guide 16 on the axis whereof is slidable the stem 17 of the valve 19. The conical edges of the said valve are adapted to fit upon the seat 18 provided in the socket 13, under the action of the water entering the meter by way of the discharge orifice, this device being intended to prevent any reverse operation of the meter and thus to obviate all frauds.

Figure 5:
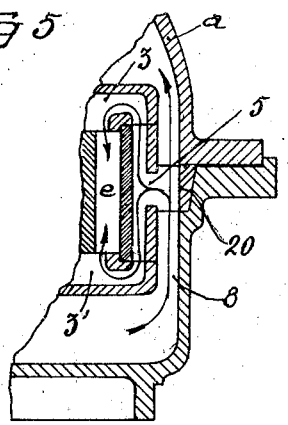
Fig. 5 is a section through the admission orifice, similar to that of Fig. 4, of a meter showing a modified form of construction with reference to the device represented in Figs. 2, 3 and 4.
Figure 6:
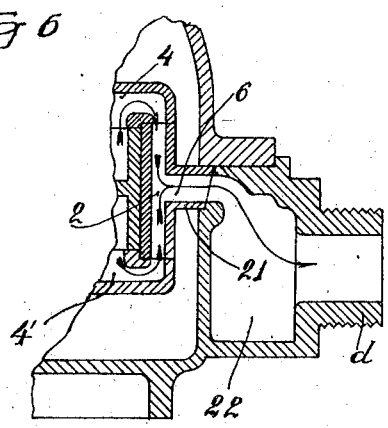
Fig. 6 is a section through the discharge orifice, similar to that of Fig. 2, of the modified form corresponding to Fig. 5.

Figs. 5 and 6 show a modified form of the apparatus as hereinbefore described. In this modified form, the peripheral portion of the crown-piece *i*, whereof the cross-section is shown at 9 and 10 (Figs. 2 and 4) has now a different construction. The water enters as before through the annular spaces 8 before passing through the orifices 5, but a portion of the water will also fill the upper part 11 of the envelope *a* containing the set of gear wheels. It is to be observed that in this arrangement the water admitted is caused to fill the whole envelope of the meter and completely surrounds the piston chamber before entering the latter, whilst the discharge water proceeds immediately from the said chamber to the discharge neck *d* of the meter after having passed through the ports 4 and $4^1$, (Fig. 6) the passage 2 and the orifice 6 surrounded by the passage 21 which enters in direct contact with the chamber 22 preceding the discharge neck *d*.

The invention relates to improvements in water meters with revoluble piston. The said improvements are comprised as follows.

I claim:

1. In a water meter, a casing having inlet and outlet openings and a chamber between said openings; an inner casing in the first named casing having an annular piston chamber, and also having an inlet opening in its wall at a point midway between its upper and lower side communicating directly with the said chamber of the first named casing and an outlet opening communicating directly with the outlet opening of said first named casing, said inlet and outlet openings of said inner casing being of the same capacity and arranged in the horizontal symmetrical plane of the piston and said inner casing being spaced from the wall of said outer casing and entirely surrounded by the water from said other casing also having symmetrically arranged ducts of the same capacity establishing communication between the said inlet and outlet openings and the upper and lower sides of said piston chamber, and a rotary piston arranged in said piston chamber.

2. In a water meter, a casing having inlet and outlet openings and a chamber between said openings; an inner casing in the first named casing having an annular piston chamber, and also having an inlet opening in its wall at a point midway between its upper and lower side communicating directly with the said chamber of the first named casing and an outlet opening communicating directly with the outlet opening of said first named casing, said inlet and outlet openings of said inner casing being of the same capacity and arranged in the horizontal symmetrical plane of the piston and said inner casing being spaced from the wall of said outer casing and entirely surrounded by the water from said other casing also having symmetrically arranged ducts of the same capacity establishing communication between the said inlet and outlet openings and the upper and lower sides of said piston chamber, a rotary piston arranged in said piston chamber, and a check valve arranged to close the inlet opening of the first named casing in the event of back pressure.

3. In a water meter, a casing having inlet and outlet openings and a chamber between said openings; an inner casing in the first named casing having an annular piston chamber, and also having an inlet opening in its wall at a point midway between its upper and lower side communicating directly with the said chamber of the first named casing and an outlet opening communicating directly with the outlet opening of said first named casing, said inlet and outlet openings of said inner casing being of the same capacity and arranged in the horizontal symmetrical plane of the piston and said inner casing being spaced from the wall of said outer casing and entirely surrounded by the water from said other casing also having symmetrically arranged ducts of the same capacity establishing communication between the said inlet and outlet openings and the upper and lower sides of said piston chamber, and a rotary piston arranged in said piston chamber, said first named casing also having a filter arranged between the inlet opening and the chamber of said casing.

4. In a water meter, a casing having inlet and outlet openings and a chamber between said openings; an inner casing in the first named casing having an annular piston chamber, and also having an inlet opening in its wall at a point midway between its upper and lower side communicating directly with the said chamber of the first named casing and an outlet opening communicating directly with the outlet opening of said first named casing, said inlet and outlet openings of said inner casing being of the same capacity and arranged in the horizontal symmetrical plane of the piston and said inner casing being spaced from the wall of said outer casing and entirely surrounded by the water from said other casing, also having symmetrically arranged ducts of the same capacity establishing communication between the said inlet and outlet openings and the upper and lower sides of said piston chamber, and a rotary piston arranged in said piston chamber, said inlet and outlet openings of the piston chamber being of a suitable section and disposed in a symmetrical plane to permit the regulation of the speeds for entry and exit of the liquid with regard to the piston chamber.

In witness whereof I affix my signature.

JOSEPH JEAN MARIE GUEUX.